United States Patent

Krallmann et al.

[11] Patent Number: 5,466,520
[45] Date of Patent: Nov. 14, 1995

[54] PAPER-LIKE WHITE-OPAQUE HEAT-SEALABLE POLYPROPYLENE FILM

[75] Inventors: Anton Krallmann, Fallingbostel; Ulrich Reiners, Neuenkirchen; Eberhard Albinus; Jürgen Böhner, both of Bomlitz; Neele Neelen, Fallingbostel, all of Germany

[73] Assignee: Wolff Walsrode Aktiengesellschaft, Walsrode, Germany

[21] Appl. No.: 234,202

[22] Filed: Apr. 28, 1994

[30] Foreign Application Priority Data

Apr. 30, 1993 [DE] Germany ............. 43 14 213.3

[51] Int. Cl.$^6$ ............................................. B32B 5/16
[52] U.S. Cl. ..................... 428/323; 428/349; 428/516; 525/240
[58] Field of Search ......................... 428/349, 516, 428/323; 525/240

[56] References Cited

U.S. PATENT DOCUMENTS

| | | | |
|---|---|---|---|
| 4,181,689 | 1/1980 | Nagatoshi et al. | 525/419 |
| 4,725,466 | 2/1988 | Crass | 428/35 |
| 4,786,562 | 11/1988 | Kakugo et al. | |
| 4,983,447 | 1/1991 | Crass | 428/349 |
| 5,176,954 | 1/1993 | Keller et al. | |
| 5,326,625 | 7/1994 | Schuhmann et al. | 428/215 |

FOREIGN PATENT DOCUMENTS

| | | |
|---|---|---|
| 83495 | 5/1986 | European Pat. Off. |
| 263598 | 9/1987 | European Pat. Off. |
| 0252718 | 1/1988 | European Pat. Off. |
| 0263698 | 4/1988 | European Pat. Off. |
| 367613 | 11/1989 | European Pat. Off. |
| 0388086 | 9/1990 | European Pat. Off. |
| 0515969 | 12/1992 | European Pat. Off. |
| 0564846 | 10/1993 | European Pat. Off. |
| 2195947 | 4/1988 | United Kingdom |

*Primary Examiner*—Edith Buffalow
*Attorney, Agent, or Firm*—Sprung Horn Kramer & Woods

[57] ABSTRACT

The invention relates to a white-opaque biaxially orientated multilayer film with good heat-sealing properties and with a paper-like appearance on at least one side, comprising an opaque core and at least one outer layer made of:

- 10–15% by weight of an isotactic polypropylene having a density of 0.9–0.91 g/cm$^3$ and a melt-flow index of 0.5 g/10 min to 8 g/10 min at 230° C. under 21.2 N load (determined to DIN 53735),
- 5–15% by weight of a low-density linear copolymer of ethylene, modified with rubber and with maleic acid anhydrite,
- 40–80% by weight of a statistical propylene/ethylene copolymer with 2 to 6% by weight of ethylene or statistical terpolymers of propylene, ethylene and butylene with a comonomer content of <15% by weight and a butylene content of <7% by weight and
- 5–15% by weight of an inorganic filler, preferably rutile-type titanium dioxide with an average diameter of 200 nm.

7 Claims, No Drawings

PAPER-LIKE WHITE-OPAQUE HEAT-SEALABLE POLYPROPYLENE FILM

The invention relates to a white-opaque heat-sealable BOPP film having a paper-like appearance on at least-one side. The paper-like appearance is obtained by means of the outer layers, which consist of a special mixture.

The packaging industry has a need for white-opaque BOPP films with a paper-like appearance, which is required for unprinted, printed and metallised applications.

A number of heat-sealable opaque BOPP films are known.

For example, EP 0 083 495 describes a three-layer opaque BOPP film structure having a high gloss due to the transparent outer layers of ash-free polypropylene. The outer layers are given a thickness sufficient to compensate irregularities in the boundary layers between the outer layers and the core layer. The resulting film has a very smooth surface combined with high gloss. The film is made opaque by adding incompatible polymers (e.g. Nylon 6) to the polypropylene.

Patent specification EP 367 613 describes a three-layer opaque BOPP film which can be written on on one side and is obtained in that the core layer has cavities, the outer layer which can be written on consists of two mutually incompatible polymers and the other outer layer is made up of propylene- ethylene random copolymers.

Patent specification JP 093554/86 describes a multilayer BOPP film made matt by an outer layer. The outer layer contains 8–65% inorganic fine powder and a polymer.

Patent specification EP 0 263 598 describes an asymmetrical three-layer film structure having tear-initiating particles of calcium carbonate in its core. One of the two outer layers is filled with titanium dioxide pigment, whereas the other outer layer is transparent. Both layers are heat-sealable. As a result of this combination of the two outer layers, the film appears white-opaque on one side and nacreous on the other side.

The known multilayer films are designed either to alter the gloss or to obtain a nacreous surface, but not to have a paper-like surface effect as increasingly required by the packaging industry, and therefore they do not meet this requirement. The problem therefore has been to provide a white-opaque foil having a paper-like appearance.

The invention relates to a multilayer white-opaque biaxially oriented heat-sealable polypropylene film having a paper-like appearance on at least one side and comprising an opaque core layer K of a polypropylene homopolymer, at least one outer layer M substantially comprising a mixture of propylene, ethylene and pigment, and a second outer layer consisting either of the same mixture as mixture M or in two layers, the intermediate layer Z, facing the core layer K consisting of polypropylene and pigment and the layer S adjacent the layer Z consisting of propylene-ethylene random copolymer.

The core layer K has a thickness of 20–70 µm and consists of:

- 75–95% by weight of polypropylene with an n-heptane-soluble content of 15% or less, a density of 0.9–0.91 g/cm$^3$ and a melt-flow index of 0.5 g/10 min to 8 g/10 min at 230° C. under a load of 21.2 N (determined to DIN 53735), a polypropylene with a melt-flow index of 1 to 5 g/10 min being specially preferred, or
- 75–95% by weight of a statistical propylene/ethylene copolymer with 2 to 6% by weight of ethylene, a density preferably of 0.895 to 0.96 g/cm$^3$, a melt-flow index of 1 to 7 g/10 min at 230° C. under a load of 21.2 N and a crystallite melting-point, depending on the type, in the range from 125 to 148° C. (under a polarisation microscope), or mixtures thereof, and 25% by weight of an inorganic filler, preferably CaCO3.

The outer layer M has a thickness of 1.5 to 2.5 µm and consists of:

- 10–15% by weight of an isotactic polypropylene with an n-heptane soluble content of 15% or less, a density of 0.9–0.91 g/cm$^3$ and a melt-flow index of 0.5 g/10 min to 8 g/10 min at 230° C. under a load of 21.2 N (determined to DIN 53735), a polypropylene with a melt-flow index of 1 to 5 g/10 min being specially preferred,
- 5–15% by weight of a low-density linear copolymer of ethylene/maleic acid anhydride polymer blended with rubber (MSA content 0.1–2.5% .by weight, rubber content 5–35%.
- 40–80% by weight of a propylene/ethylene random copolymer with 2 to 6% by weight of ethylene or a random terpolymer of propylene, ethylene and butylene with an ethylene content of<15% by weight and a butylene content of <7% by weight and
- 5–15% by weight of an inorganic filler, preferably titanium dioxide, manufactured in futile form with an average diameter of 200 nanometers.

The layer Z has a thickness of 1–2 µm and consists of:

- 85–95% by weight of an isotactic polypropylene with an n-heptane soluble content of 15% or less, a density of 0.9–0.91 g/cm$^3$ and a melt-flow index of 0.5 g/10 min to 8 g/10 min at 230° C. under a load of 21.2 N (determined to DIN 53735), a polypropylene having a melt-flow index of 1 to 5 g/10 min being particularly preferred, and
- 5–15% by weight of an inorganic filler, preferably titanium dioxide, prepared in rutile form with an average diameter of 200 nanometers.

The layer S has a thickness of 1 µm and consists of:

- a propylene-ethylene random copolymer with 2 to 6% by weight of ethylene, a density preferably of 0.895 to 0.96 g/cm$^3$, a melt-flow index of 1 to 7 g/10 min at 230° C. under a load of 21.2 N and a crystallite melting-point, depending on the type, in the range from 125° to 148° C. (under a polarisation microscope). The main processing additives, e.g. anti-blocking agents such as finely-divided silica dioxide, lubricants such as erucic acid amide and antistatic agents are optionally added in the last-mentioned layer.

The film according to the invention is manufactured by known methods, e.g. co-extrusion of a three-layer film. The co-extruded film is cooled after leaving the sheet nozzle. The film is then re-heated to 120°–130° C. and longitudinally stretched in the ratio of 3:1 to 7:1, preferably 4:1 to 5:1. Longitudinal stretching at temperatures between 150° and 180° C. in the stretching tunnel is followed by transverse stretching in the ratio of 7:1 to 12:1, preferably 8:1 to 9:1. Before leaving the stretching tunnel, the film is thermo-set. Before being coiled, the film is subjected to corona pretreatment or flame pretreatment. Three-layer co-extrusion of the core layer K, the outer layer M and the intermediate layer Z, after the layers have been simultaneously longitudinally stretched as previously described, is an alternative or supplement to the previously-described method of producing a four-layer film. After leaving the longitudinal stretching part and before entering the transverse stretching part, the sealing layer S is laminated or extruded as described in EP 0 424 761

A2. After the sealing layer has been applied, the composite film is transversely stretched in the ratio 7:1 to 12:1, preferably 8:1 to 9:1, followed in conventional manner by thermosetting and corona or flame pretreatment.

Unexpectedly it has been found that the film according to the invention has properties very similar to paper, as a result of the aforementioned outer layer in conjunction with the opaque core layer. One particularly surprising fact is that the film also has excellent heat-sealing properties, and the titanium dioxide particles in the outer layer are not visible on the surface of the film. In general, inorganically filled layers are covered by unfilled outer layers, to prevent the inorganic substances emerging at the surface. If they emerge at the surface, these inorganic particles will immediately cause deposits on parts of machinery, resulting in disturbances and stoppages of the packaging machine.

The film according to the invention is used for packaging, particularly for food which needs to be protected from light, ultraviolet light and water-vapour. The film according to the invention can be upgraded by printing, metallising and/or by providing with cold-seal material. The film according to the invention provides many facilities for designing packaging for goods on sale, e.g. chocolate, with special optical effects.

In the examples hereinafter, the following test methods and methods of determining properties were used:

The gloss was determined to DIN 67530. In the present case the gloss is the proportion of light reflected at an angle of 60° and measured in gloss units GE.

The opacity of a film to DIN 53146 is the ratio of the reflection factor $R_o$ of a sheet over a black standard to the reflection factor $R_{oo}$ of a stack of at least 24 sheets.

The sealed seam strength was tested as follows: the sides of the film were sealed together for 0.5 seconds using sealing jaws heated to 130° C. at a pressure of 5 bars. The force needed to reopen the sealed seam was then measured. The sealed seam strength was regarded as good when the force required reached 2.5 N for a strip width of 15 mm.

EXAMPLE 1

A three-layer film having a paper-like appearance on both sides and a total thickness of 40 μm was produced by co-extrusion followed by orientation by stretching and thermosetting. Both outer layers M had a thickness of 2 μm and the core layer K had a thickness of 36 μm.

The core layer K consisted of polypropylene with 14% by weight of calcium carbonate (type: milicarb OG®). The melt-flow index of the polypropylene was 3.0 g/10 min (230° C., 21.2 N).

The outer layers consisted of the following components:

10% by weight of titanium dioxide inorganic filler (Kronos 2200®),

10% by weight of an isotactic polypropylene with a melt-flow index of 3.0 g/10 min (230° C., 21.2 N), 10% by weight of a linear polyethylene modified with maleic acid anhydrite and with a melt-flow index of 1.7 g/10 min (190° C., 21.2 N) and a Vicat softening point of 76° C., and 70% by weight of a propylene-ethylene random copolymer with a melt-flow index of 4.7 g/10 min (230° C., 21.2 N) and a melting-point of 135° C.

Small quantities of anti-static agent (ethoxylated fatty acid amides) and lubricant (erucic acid amide) were added to the outer layers.

The film was manufactured with a longitudinal stretching ratio of 5.0:1 and a transverse stretching ratio of 9.8:1. Thermosetting occurred at a temperature of 160° C. One of the two outer layers was given corona pretreatment.

EXAMPLE 2

A four-layer film having a paper-like appearance on one side, a glossy surface on the other side and a total thickness of 40 μm was produced by co-extrusion followed by orientation by stretching and thermosetting. The outer layer M had a thickness of 2 μm, the core layer K had a thickness of 37 μm, an intermediate layer Z had a thickness of 2 μm and the other outer layer S had a thickness of 1 μm.

The core layer K consisted of polypropylene with 14% by weight of calcium carbonate (type: milicarb OG®). The melt-flow index of the polypropylene was 3.0 g/10 min (230° C., 21.2 N).

The outer layer M consisted of the following components:

10% by weight of titanium dioxide inorganic filler (Kronos 200®),

10% by weight of an isotactic polypropylene with a melt-flow index of 3.0 g/10 min, 21.2 N, 10% by weight of a linear polyethylene modified with maleic acid anhydride, with a melt-flow index of 1.7 g/10 min (190° C., 21.2 N) and a Vicat softening point of 76° C., and 70% by weight of a propylene/ethylene random copolymer with a melt-flow index of 4.7 g/10 min and a melting-point of 135° C.

The intermediate layer Z had the following formulation:

10% by weight of titanium dioxide inorganic filler (Kronos 2200®) and

90% by weight of polypropylene with a melt-flow index of 3.0 g/10 min (230° C., 21.2 N).

The sealing layer had the following composition:

99.4% by weight of a propylene/ethylene random copolymer with a melt-flow index of 4.7 g/10 min (230° C., 21.2 N) and a melting-point of 135° C. and 0.4% by weight of silica dioxide inorganic anti-blocking agent (Sylobloc 44®).

Small quantities of anti-static agent (ethoxylated fatty acid amides) and lubricants (erucic acid amide) were added to the outer layers.

The film was manufactured with a longitudinal stretching ratio of 5.0:1 and a transverse stretching ratio of 9.8:1. it was thermo-set at a temperature of 160° C. One of the two outer layers was given corona pretreatment.

COMPARATIVE EXAMPLE 1

A three-layer film was produced as in Example 1, the two outer layers having the following formulation:

10% by weight of titanium dioxide inorganic filler (Kronos 2200®),

10% by weight of an isotactic polypropylene with a melt-flow index of 3.0 g/10 min (230° C., 21.2 N) and 80% by weight of a propylene/ethylene random copolymer with a melt-flow index of 4.7 g/10 min and a melting-point of 135° C.

COMPARATIVE EXAMPLE 2

A three-layer film was produced as in Example 1, with outer layers having the following composition:

10% by weight of titanium dioxide inorganic filler (Kronos 2200®) and

90% by weight of a polypropylene with a melt-flow index of 3.0 g/10 min (230° C., 21.2 N).

The results are shown in the following comparative table:

Comparative Table:

|  | Gloss 60° a-side | Gloss 60° b-side | Opacity | Paper-like appearance, a-side | Sealed-seam strength a-side against a-side | Paper-like appearance, b-side |
| --- | --- | --- | --- | --- | --- | --- |
| Example 1 | 8 | 8 | 80 | ++ | + | ++ |
| Example 2 | 8 | 60 | 79 | ++ | + | − |
| Comparative Example 1 | 55 | 55 | 80 | − | + | − |
| Comparative Example 2 | 58 | 58 | 81 | − | * | − |

++ = very good, + = good, o = fair, − = unsatisfactroy.
* = not applicable

Only the examples according to the invention have low gloss combined with a paper-like character and the required heat-sealing properties, and thus meet the requirements.

We claim:

1. A white-opaque biaxially oriented multilayer film with good heat-sealing properties and with a paper-like appearance on at least one side, comprising an opaque core and at least one outer layer the core comprising a polypropylene and a filler, the outer layer comprising 10–15% by weight of an isotactic polypropylene having a density of 0.9–0.91 g/cm³ and a melt-flow index of 0.5 g/10 min to 8 g/10 min at 230° C. under 21.2 N load, 5–15% by weight of a low-density linear ethylene/maleic acid anhydride polymer blended with rubber (MSA content 0.1–2.5% by weight, rubber content 5–35%), 40–80% by weight of a statistical propylene/ethylene copolymer with 2 to 6% by weight of ethylene, or a statistical terpolymer of propylene, ethylene and butylene with an ethylene content of <15% by weight and a butylene content of <7% by weight, and 5–15% by weight of an inorganic filler.

2. A multilayer film according to claim 1, wherein the other outer layer is either of the same composition as the first or comprises two layers, one layer serving as an intermediate layer and comprising polypropylene and a pigment and the other comprising a polypropylene/ethylene random copolymer.

3. A multilayer film according to claim 1, corona-pretreated on one side.

4. A multilayer film according to claim 1, which is metallised.

5. A multilayer film according to claim 1, carrying a cold-seal material.

6. A multilayer film according to claim 1, wherein the inorganic filler comprises rutile titanium dioxide particles of an average diameter of about 200 nm.

7. A package comprising an edible material sealed in a film according to claim 1.

* * * * *